United States Patent [19]

Urano et al.

[11] 4,132,472
[45] Jan. 2, 1979

[54] REPLACEABLE FINDER SYSTEM FOR SINGLE-LENS REFLEX CAMERA

[75] Inventors: Fumio Urano, Omiya; Akihiro Arai, Tokyo; Takumi Kobayashi, Tokyo; Junji Umetsu, Tokyo, all of Japan

[73] Assignee: Asahi Kogaku Kogyo Kabushiki Kaisha, Tokyo, Japan

[21] Appl. No.: 806,124

[22] Filed: Jun. 13, 1977

[30] Foreign Application Priority Data

Jun. 23, 1976 [JP] Japan .................................. 51-74191

[51] Int. Cl.² ....................... G03B 19/12; G03B 17/20
[52] U.S. Cl. ...................................... 354/155; 354/53
[58] Field of Search ................ 354/219, 200, 150-155, 354/53, 54

[56] References Cited

U.S. PATENT DOCUMENTS

| 3,630,133 | 12/1971 | Shimomura | 354/155 |
| 3,903,530 | 9/1975 | Taguchi et al. | 354/53 |
| 3,967,299 | 6/1976 | Shono | 354/219 |
| 3,996,593 | 12/1976 | Uno et al. | 354/219 X |

FOREIGN PATENT DOCUMENTS

| 1004914 | 3/1957 | Fed. Rep. of Germany | 354/200 |
| 1152603 | 8/1963 | Fed. Rep. of Germany | 354/152 |
| 1171727 | 6/1964 | Fed. Rep. of Germany | 354/152 |
| 1010226 | 11/1965 | United Kingdom | 354/155 |

*Primary Examiner*—Donald A. Griffin
*Attorney, Agent, or Firm*—Sughrue, Rothwell, Mion, Zinn and Macpeak

[57] ABSTRACT

An SLR camera having a replaceable penta-prism 6 slidably inserted from the rear face of the camera via mating flange rails 13a on the finder body and recessed grooves 8a in the camera body, a replaceable focal plate or screen 3 removably mounted in a pivotal holding plate 11 accessible through the lens mount 9, and a meter display system extending into the viewing frame of the finder and interposed between the penta-prism and the focal plate. The display system may include a shutter speed scale 15 and an overlying manual speed pointer 16 readable from the lens light, and an inset LED array 17 for indicating the meter reading.

7 Claims, 5 Drawing Figures

REPLACEABLE FINDER SYSTEM FOR SINGLE-LENS REFLEX CAMERA

BACKGROUND OF THE INVENTION

This invention relates to a replaceable or interchangeable finder system for a single-lens reflex (SLR) camera.

In the development of flexible SLR camera systems, the finders are commonly designed to be replaceable or interchangeable, whereby a variety of different finders (waist level finders and high magnification finders, for example) can be selectively used for specialized purposes.

Recently, a number of SLR cameras having automatic exposure control systems have also been developed. In such cameras it is convenient for the photographer to have the controlled exposure parameters (such as shutter speed when the aperture opening has priority) displayed in the finder, and such a display is employed in most of the newer automatic exposure control SLR cameras.

Heretofore, in order to display an exposure meter indication in a replaceable finder for an SLR camera, two methods have been employed: in one outside light (other than light passing through the lens) is introduced into the penta-prism through small prisms, while in the other a complete meter display, including an electrical drive circuit therefor, is included in each replaceable finder. The use of small prisms increases the cost of each finder, however, and in addition the viewing conditions of the finder are degraded by such prisms. In the latter method, on the other hand, a separate meter indicator for each finder greatly increases the cost thereof, and in addition a detachable power source connection between the camera body and the replaceable finder is required.

FIG. 5 shows a rear sectional view of a conventional finder system, wherein reference numeral 101 designates a camera body, 102 a top cover, 103 a focal plate, 104 a condenser lens, 107 a replaceable or interchangeable penta-prism, 108 a finder body, and 109 a cover for the finder body. The focal plate 103 and condenser lens 104 are combined into one unit by a frame 106 and a retaining plate 105. Thus, after the finder is removed from the camera body 101, the focal plate and condenser lens unit can also be removed in the same direction. To display the exposure meter indication in the finder it is necessary to form an image of the exposure meter therein using small prisms, or to mount an exposure meter on the side of each replaceable finder, as described above. FIG. 5 shows an example of the former case, wherein the images of a meter pointer 113, a manual pointer 112, and a shutter speed scale 111 are bent by a first small prism 110 with light entering the camera through a window 102a in the top cover 102 and brought into the penta-prism 107 through a second small prism 114 cemented thereto. To display the exposure meter indication in the finder the construction and configuration thereof must be such that the second small prism 114 can easily be adhered to it. This reduces the viewing conditions in the finder, and the cost of the camera is attendantly increased by the presence of the small prisms. The alternative of employing LEDs, on the other hand, makes the arrangement of the camera circuitry unduly intricate.

SUMMARY OF THE INVENTION

Briefly, and in accordance with the present invention, an SLR camera has a replaceable penta-prism slidably inserted from the rear face of the camera via mating flange rails on the finder body and recessed grooves in the camera body, a replaceable focal plate or screen removably mounted in a pivotal holding plate accessible through the lens mount, and a meter display system extending into the viewing frame of the finder and interposed between the penta-prism and the focal plate. The display system may include a shutter speed scale and an overlying manual speed pointer readable from the lens light, and an inset LED array for indicating the meter reading.

With such an arrangement the penta-prism and focal plate are freely and selectively replaceable, and neither interferes with or incorporates any of the display system elements.

DETAILED DESCRIPTION OF THE PREFERRED EMBODIMENTS

Figure 1:
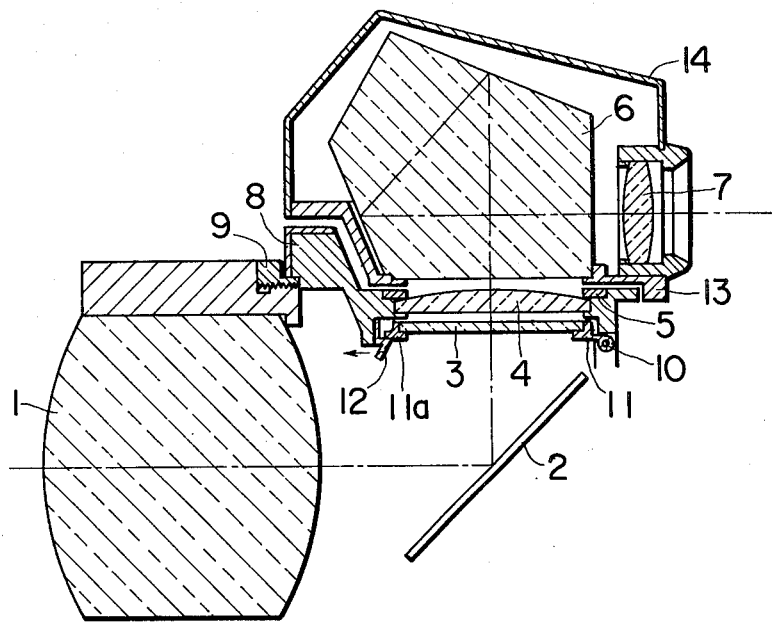
FIGS. 1 and 2 show sectional views of one embodiment of the invention, as viewed from the side and the rear of a camera, respectively.
Figure 2:
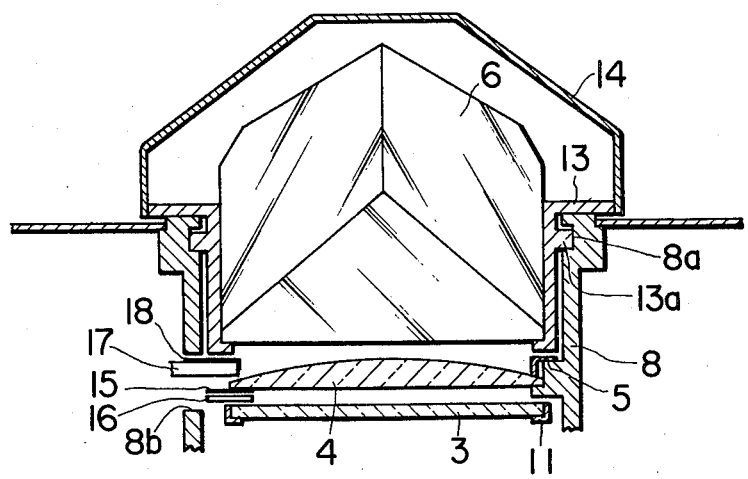

Referring now to FIGS. 1 and 2, light passing through a camera lens 1 is focused onto a focal plate 3 via a reflex mirror 2 to form an image which may be observed through a condenser lens 4, a penta-prism 6, and a magnifying lens or eyepiece 7. This type of optical system is well known in the art. The condenser lens 4 is secured to a camera body 8 by a retaining plate 5, and the focal plate 3 is surrounded by a holding plate 11 pivotally mounted on a shaft 10. One end 11a of the plate 11 is engaged by a spring retaining clip 12 secured to the body 8.

If the spring clip 12 is pulled by the index finger in the direction of the arrow in FIG. 1, the end 11a of the holding plate becomes disengaged from the clip whereby the focal plate 3 and holding plate 11 pivot downward about shaft 10. It is then possible to remove the focal plate by the fingers, a suitable tweezers, etc. inserted through the lens mount 9, and to replace it with a different one. The installation of a new focal plate in the optical system is accomplished by inserting it into the holding plate 11 and raising the latter until the end 11a snaps into engagement with the spring clip 12.

The penta-prism 6 is suitably positioned and held in a finder body 13 separate from the camera body 8, and enclosed by a cover 14. A description of the method of mounting the penta-prism 6 in the finder body is omitted because same is well known in the art.

In FIG. 2 a film supply and rewind spool would be positioned on the left side and a film takeup spool on the right side, with the film itself lying just above the plane of the paper. Flange rails 13a are disposed on both sides of the finder body 13 and engage recessed grooves 8a on the sides of the camera body 8, whereby the penta-prism can be detachably inserted into the camera body from the rear. The left side of the camera body has an aperture 8b in which a manual pointer 16, a shutter speed scale 15, and an LED array 17 are disposed in the described order from bottom to top. A plate 18 covers a recess in the condenser lens retaining plate 5 into which the LED array is inserted, and has a line of holes 17a (FIG. 4) corresponding to the LEDs so that each energized LED can be seen through the finder. The shutter speed scale 15 and the manual pointer 16 are disposed between the condenser lens 4 and the focal plate 3 and extend into the finder picture frame, while the LED array is disposed between the penta-prism 6 and the condenser lens 4 outside of the picture frame. Thus, the shutter speed scale and manual pointer can be seen in the finder from the light entering through the lens 1, and the energized LED can be seen from its own illumination.

Figure 3:
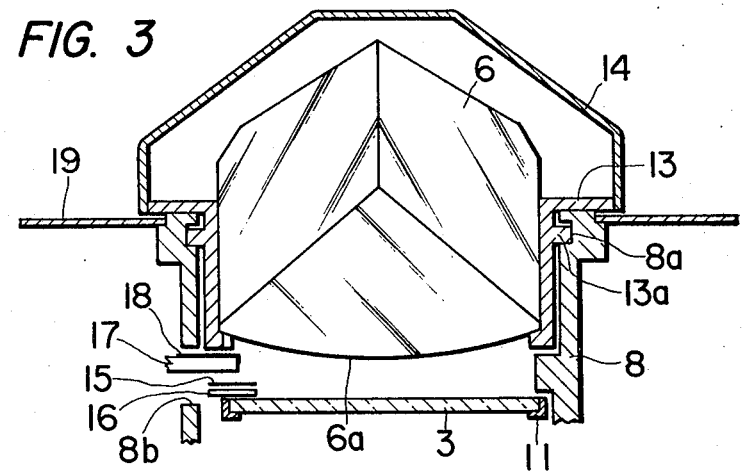
FIG. 3 shows a sectional view of a similar finder optical system but without a condenser lens, as viewed from its rear side.

In keeping with the tendency to miniaturize cameras the alternate embodiment shown in FIG. 3 may be used, wherein the condenser lens is removed and the lower surface 6a of the penta-prism is formed as a convex lens to implement a condensing function. In this embodiment the LED array 17, the shutter speed scale 15, and the manual pointer 16 are disposed between the replaceable penta-prism 6 and the replaceable focal plate 3. The arrangement of the other components is similar to that shown in FIG. 2 and will not be described.

Figure 4:
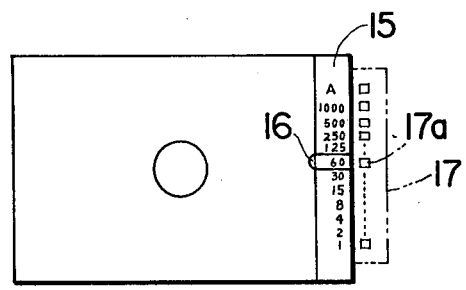
FIG. 4 shows a diagram of a meter display system in a finder.
Figure 5:
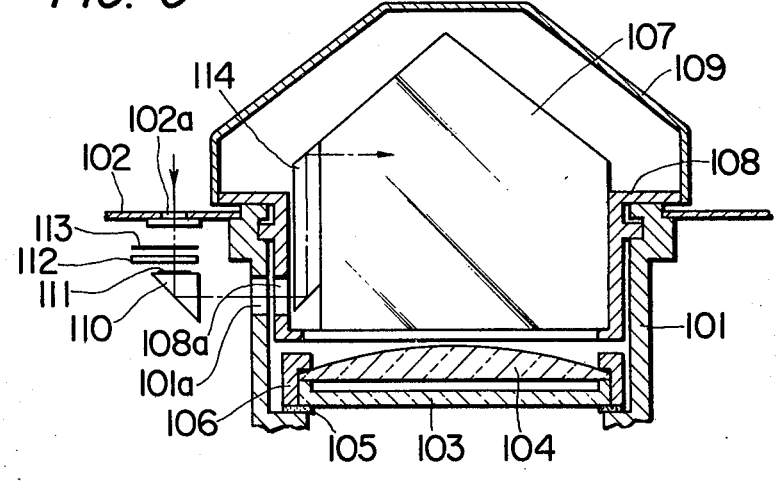
FIG. 5 shows a rear sectional view of a conventional finder optical system.

FIG. 4 illustrates the display presentation in the above-described finder, wherein, by way of example, the manual pointer 16 indicates a shutter speed of 1/60 second, and the energized LED also indicates 1/60 second, thus indicating that suitable exposure conditions exist.

In the above description only shutter speeds are shown as being displayed in the finder. As is obvious, however, aperture control values can also be displayed with equal facility.

What is claimed is:

1. In a finder system for a single-lens reflex camera including a camera body, a lens mount disposed on the front of the body and enabling access to the interior thereof, a pivotal reflex mirror disposed within the body behind the lens mount, a focal plate disposed above the reflex mirror, a penta-prism mounted to the body above the focal plate, and exposure meter display indicia viewable through the penta-prism, the improvements characterized by:
   (a) the focal plate being removable through the lens mount in such a manner as to be interchangeable with a selected one of a plurality of available focal plates,
   (b) the penta-prism being removable from the camera body in such a manner as to be interchangeable with a selected one of a plurality of available penta-prisms, and
   (c) the exposure meter display indicia being disposed between the penta-prism and the focal plate and being independent therefrom, whereby the removal and replacement of the penta-prism and/or the focal plate does not interfere with the meter display indicia.

2. A finder system as defined in claim 1, wherein the meter display indicia includes a manually controlled pointer and a shutter speed scale or an aperture value scale projecting into the finder picture frame, and an LED array enrgizable in accordance with the exposure meter output disposed just outside of the finder picture frame.

3. A finder system as defined in claim 2, wherein the focal plate is removably held in a frame member pivotally mounted for rotation about a hinge axis disposed just above and parallel to the reflex mirror axis, and further comprising spring clip means mounted to the camera body for latching the frame member in a raised position.

4. A finder system as defined in claim 2 wherein the penta-prism is mounted in a covered frame member having flange rails extending outwardly from the sides thereof, and the camera body has recessed grooves in the upper portion thereof opening on the rear of the body and configured to mate with said flange rails, whereby the penta-prism frame member is slidably insertable into the camera body from the rear thereof.

5. A finder system as defined in claim 1, wherein the focal plate is removably held in a frame member pivotally mounted for rotation about a hinge axis disposed just above and parallel to the reflex mirror axis, and further comprising spring clip means mounted to the camera body for latching the frame member in a raised position.

6. A finder system as defined in claim 5 wherein the penta-prism is mounted in a covered frame member having flange rails extending outwardly from the sides thereof, and the camera body has recessed grooves in the upper portion thereof opening on the rear of the body and configured to mate with said flange rails, whereby the penta-prism frame member is slidably insertable into the camera body from the rear thereof.

7. A finder system as defined in claim 1, wherein the penta-prism is mounted in a covered frame member having flange rails extending outwardly from the sides thereof, and the camera body has recessed grooves in the upper portion thereof opening on the rear of the body and configured to mate with said flange rails, whereby the penta-prism frame member is slidably insertable into the camera body from the rear thereof.

* * * * *